(12) United States Patent
DePaoli et al.

(10) Patent No.: US 7,914,766 B1
(45) Date of Patent: Mar. 29, 2011

(54) INORGANIC RESINS FOR CLINICAL USE OF $^{213}$BI GENERATORS

(75) Inventors: David W. DePaoli, Knoxville, TN (US); Michael Z. Hu, Knoxville, TN (US); Saed Mirzadeh, Knoxville, TN (US); John W. Clavier, Elizabethton, TN (US)

(73) Assignee: UT-Battelle LLC, Oak Ridge, TN (US)

( * ) Notice: Subject to any disclaimer, the term of this patent is extended or adjusted under 35 U.S.C. 154(b) by 146 days.

(21) Appl. No.: 10/860,520

(22) Filed: Jun. 3, 2004

(51) Int. Cl.
*A61K 51/00* (2006.01)
*A61M 36/14* (2006.01)

(52) U.S. Cl. ..................... 424/1.11; 424/1.65

(58) Field of Classification Search ............. 424/1.65
See application file for complete search history.

(56) References Cited

U.S. PATENT DOCUMENTS

| | | | | |
|---|---|---|---|---|
| 4,789,479 | A * | 12/1988 | Onitsuka et al. | 210/635 |
| 5,774,782 | A | 6/1998 | Mirzadeh et al. | |
| 6,156,431 | A * | 12/2000 | Kitchen et al. | 428/405 |
| 6,603,127 | B1 | 8/2003 | Scheinberg et al. | |
| 2003/0012715 | A1 | 1/2003 | Bond et al. | |

FOREIGN PATENT DOCUMENTS

WO  WO0040275  *  7/2000

OTHER PUBLICATIONS

DePaoli et al. Isotopes Program Financial and Business Meeting 2002.*
Clavier et al. (Abstracts of Papers, 225th ACS National meeting, New Orleans, LA, Mar. 23-27, 2003, NUCL-064).*
Nakanishi et al. (J. Sol-gel Sci. Tech. 1997, 8, 547-552).*
Clavier et al., "Improved Inorganic Resin for Clinical Use of 213Bi Generators", The American Chemistry Society 225th National Meeting, Mar. 23-27, 2003.
R. A. Boll, et al., "Optimizations of Radiolabeling of Immunoproteins with 213Bi," Radiochimica Acta, 1997, pp. 145-149, vol. 79.
C. Wu, et. al., "An Improved Generator for the Production of 213Bi from 225Ac," Radiochimica Acta, 1997, pp. 141-144, vol. 79.
D S. Wilbur, et al., "Development of a Unique Bismuth (Bi-213) Automated Generator for Use in Cancer Therapy," Ind. Eng. Chem. Res., 2000, pp. 3189-3194, vol. 39.
R. B. Huneke, et al., "Effective α-Particle-mediated Radioimmunotherapy of Murine Leukemia," Cancer Research, Oct. 1992, pp. 5818-5820, vol. 52.

M. W. Geerlings, "Radionuclides for Radiommunotherapy: Criteria for Selection," International Journal of Biological Markers, 1993, pp. 180-186. vol. 8, No. 3.
M. W. Geerlings, et al., "The Feasibility of 225Ac as a Source α-Particles in Radioimmunotherapy," Nuclear Medicine Communications, 1993, pp. 121-125, vol. 14.
M. W. Geerling, et al., "Radioimmunotherapy Using α-Particles Emission," International Patent WO 90/15625, 1990.
C. G. Pippin, et al., "Recovery of Bi-213 from an Ac-225 COW: Appl. to the Radiolabeling of Antibodies with Bi-213," Chemists' Views of imaging Centers., 1995, pp. 315-322.
K. K. S. Pillay, "A Review of the Radiation Stability of Ion Exchange Materials," Journal of Radioanalytical & Nuclear Chemistry, 1980, pp. 247-268,vol. 102, No. 1.
L. L. Hench, et al., "The Sol-Gel Process," Chem. Rev., 1990, pp. 33-72, vol. 90.
A. M. Buckley, et al., "The Sol-Gel Preparation of Silica Gels," J. of Chemical Education, pp. 599-602, vol. 71, No. 7, 1994.
J. S. Beck, et al., "A New Family of Mesoporous Molecular Sieves Prepared with Liquid Crystal Templates," J. A.m. Chem. Soc., 1992, pp. 10834-10843, vol. 114.
S. A. Bagshaw, et al., "Templating of Mesoporous Molecular Sieves by Nonionic Polyethylene Oxide Surfactants," Science, Sep. 1995, pp. 1242-1244, vol. 269, No. 5228.
J. W. Claiver, et al., "Improved Inorganic Resin for Cinical Use of 213Bi Generators," pp. 1-7 (Powerpoint Presentation), Mar. 23-27, 2003.
D. W. DePaoli, et al., "Improved Generators for Clinical Use of Bismuth-213," pp. 1-15 (Powerpoint Presentation), Feb. 28, 2002.

* cited by examiner

*Primary Examiner* — Michael G Hartley
*Assistant Examiner* — Melissa Perreira
(74) *Attorney, Agent, or Firm* — Quarles & Brady, LLP (57) ABSTRACT

Applicant's invention is a radionuclide generator resin material for radiochemical separation of daughter radionuclides, particularly $^{213}$Bi, from a solution of parental radionuclides, the resin material capable of providing clinical quantities of $^{213}$Bi of at least 20-mCi, wherein the resin material comprises a silica-based structure having at least one bifunctional ligand covalently attached to the surface of the silica-based structure. The bifunctional ligand comprises a chemical group having desirable surface functionality to enable the covalent attachment of the bifunctional ligand thereon the surface of the structure and the bifunctional ligand further comprises a second chemical group capable of binding and holding the parental radionuclides on the resin material while allowing the daughter radionuclides to elute off the resin material. The bifunctional ligand has a carbon chain with a limited number of carbons to maintain radiation stability of the resin material.

19 Claims, 13 Drawing Sheets

3-mercaptopropyltrimethoxysilane

3-Sulfonic acid propyltrihydroxylsilane

INORGANIC RESINS FOR CLINICAL USE OF $^{213}$BI GENERATORS

The United States government has rights in this invention pursuant to contract no. DE-AC05-00OR22725 between the United States Department of Energy and UT-Battelle, LLC.

FIELD OF THE INVENTION

The present invention relates to the field of radioimmunotherapy and the radiochemical separation of a daughter radionuclide from its parental radionuclides for use in medicinal treatments, and more particularly to an inorganic resin material used as a generator system for the radiochemical separation of $^{213}$Bi ions from solution containing radioactive parental ions such as $^{225}$Ac wherein the inorganic resin material is capable of providing clinical quantities of $^{213}$Bi of at least 20 mCi while simultaneously improving the generator yield and purity.

BACKGROUND OF THE INVENTION

The α-emitting radionuclides chelated to antibodies can give a high degree of tumoricidal activity. In radioimmunotherapy, α-emitting nuclides have been used for the treatment of leukemia and highly vascular tumors. When administered to a patient, the antibody attaches to the cancer cell and delivers a lethal radiation dose while sparing the surrounding healthy tissue. This is due to the short penetration range (40-100 μm) and high linear energy transfer in tissue of alpha particles from natural decay of α-emitting radionuclides.

In recent years, $^{212}$Bi (half life=60.6 min) has been considered to be the α-emitter of choice. $^{212}$Bi has been successfully used for radioimmunotherapy studies of leukemic mice, and human trials are currently underway. One disadvantage of $^{212}$Bi is the shielding requirements that arise from the 2.26 MeV γ-ray of the $^{212}$Bi daughter, $^{208}$Tl. However, $^{213}$Bi ($T_{1/2}$=45.6 min) can be used as an alternative to $^{212}$Bi. $^{213}$Bi has less intense γ-ray emission, emitting a 440 keV γ-ray. Due to its lower energy, it may generate images comparable to $^{131}$I. The initial clinical trials in patients with acute myeloid leukemia have demonstrated the effectiveness of the alpha emitter $^{213}$Bi in killing cancer cells (Jurcic et al, 2002). Recent preclinical studies have also demonstrated the potential application of $^{213}$Bi in a variety of cancer systems and targeted radiotherapy.

$^{213}$Bi is currently available through a $^{225}$Ac/$^{213}$Bi generator. The generator uses a cation-exchange resin BioRad® MP-50 (U.S. Pat. No. 6,603,127, issued Aug. 5, 2003) which has been used in the past in $^{224}$Ra/$^{212}$Bi generator systems. This generator failed to function after a few days when large amounts (20 mCi) of $^{225}$Ac were loaded onto the generator. The organic-based resins are not stable in high radiation field and due to radiolysis they breakdown resulting in an increase in $^{225}$Ac breakthrough and flow restriction. An alternative generator that has been used in the past is a two-stage silica-based extraction system (Wu et. al., 1997), but it is time consuming and gives a low bismuth yield. Therefore, ion exchange generator systems are needed that possess higher radiation stability, faster mass transfer, increased yield and purity, demonstrate selectivity with low Ac breakthrough and have a higher capacity.

OBJECTS OF THE INVENTION

Accordingly, it is an object of the present invention to provide an improved generator system capable of providing clinical quantities of $^{213}$Bi of at least 20 mCi.

It is another object of the present invention to provide an improved generator system that has an improved generator yield and purity.

It is yet another object of the present invention to provide an improved generator system that has higher radiation stability.

These and other objects, features and advantages of the present invention will become apparent after a review of the following detailed description of the disclosed embodiments and the appended claims.

SUMMARY OF THE INVENTION

In accordance with one aspect of the present invention, the foregoing and other objects are achieved by a radionuclide generator resin material for radiochemical separation of daughter radionuclides from a solution of parental radionuclides wherein the resin material comprises a silica-based structure having at least one bifunctional ligand covalently attached to the surface of the silica-based structure wherein the bifunctional ligand comprises a chemical group having desirable surface functionality to enable the covalent attachment of the bifunctional ligand thereon the surface of the structure. The bifunctional ligand further comprises a second chemical group capable of binding and holding the parental radionuclides on the resin material while allowing the daughter radionuclides to elute off the resin material and wherein the bifunctional ligand has a carbon chain with a limited number of carbons to maintain radiation stability of the resin material.

In accordance with another aspect of the present invention, other objects are achieved by a $^{213}$Bi generator resin material for separation of $^{213}$Bi from a solution of parental radionuclides wherein the resin material is capable of providing clinical quantities of $^{213}$Bi of at least 20-mCi wherein the resin material comprises a silica-based structure having at least one bifunctional ligand covalently attached to the surface of the silica-based structure. The bifunctional ligand comprises a chemical group having desirable surface functionality to enable the covalent attachment of the bifunctional ligand thereon the surface of the structure. The bifunctional ligand further comprises a second chemical group capable of binding and holding the parental radionuclides on the resin material while allowing the $^{213}$Bi daughter to elute off the resin material and wherein the bifunctional ligand has a carbon chain with a limited number of carbons to maintain radiation stability of the resin material.

For a better understanding of the present invention, together with other and further objects, advantages and capabilities thereof, reference is made to the following disclosure and appended claims in connection with the above-described drawings.

DETAILED DESCRIPTION OF THE INVENTION

Applicant's invention disclosed and claimed herein is an improved generator of inorganic resin capable of providing clinical quantities of $^{213}$Bi (at least 20-mCi) while simultaneously improving the generator yield and purity.

Currently, commercially available polymer-based cation exchange resins such as BioRad® AG-50 (polystyrene-divinylbenzene sulfonic acid resin) (BioRad) or BioRad® MP-50 (macroporous polystyrene-divinylbenzene-quaternary ammonium resin) (BioRad), are used in clinical $^{213}$Bi generators. Cation exchange resins made of an organic polymer resin tend to deteriorate over time in high radiation field from high levels of $^{225}$Ac (20 mCi). Commercially available BioRad® AG-50 or BioRad® MP-50 resins use a sulfonic acid functional group to bind both $^{225}$Ac and $^{213}$Bi in dilute nitric acids, while releasing the Bi ions when iodide ions are present in the eluent. Applicant's invention uses an inorganic silica-based material for the backbone of the resin and a bifunctional sulfonic acid ligand which is grafted via a short organic chain, preferably 4 carbons or less, to the surface of the inorganic material. The organic chain is limited in the number of carbons so to maintain radiation stability of the resin material. Obviously, the use of a long, organic chain for linking the functional groups to the resin backbone, defeats the purpose. It is well known that inorganic materials exhibit higher radiation stability than organic material. The inorganic silica-based resin of the present invention has demonstrated good radiation resistance while performing similar to the organic-based resin with respect to retention of $^{225}$AC, and elution of $^{213}$Bi. Applicant's resin material can also be used for radiochemical separations of $^{213}$Bi from a solution of other parental radionuclides as well as for radiochemical separations of other daughter radionuclides from solutions of parental radionuclides as well.

Applicant's invention replaces the commercially available organic-based resins that have limitations in lifetime due to radiolysis, with an inorganic-based resin having superior radiation resistance. This replacement of the resin backbone with inorganic material minimizes radiation damage to the resin's support. The silica-based cation-exchanger $^{225}$Ac/$^{213}$Bi generator of Applicant's present invention was designed to demonstrate the required selectivity, comparable capacity, and, most importantly, higher radiation resistance.

In the past, ordered mesoporous metal oxide (SiO$_2$) materials have been successfully synthesized using surfactant micellar structures as templates. These mesoporous sieves can possess a hexagonal array of uniform mesopores. They can be synthesized with uniform channels varying from approximately 15 Å to greater than 100 Å in size. The relatively large pore sizes in these materials make them very attractive for applications such as catalysts, catalytic supports, and sorbents, especially when the molecules involved are too large to fit in the microporous channels of conventional zeolites. The large pore materials typically have surface areas above 700 m$^2$/g and hydrocarbon sorption capacities of 0.7 cc/g and greater. Applicant's silica-based cation-exchanger can be synthesized as having a mesoporous structure.

Mesostructure synthesis relies on surfactant micelles or liquid-crystal arrays of micelles as structure directing agents (templates) for the assembly and polymerization of inorganic precursors at the surfactant-solution interface. Mesoporous silica molecular sieves have been prepared by the hydrolysis of tetraethylorthosilicate in the presence of low-cost, non-toxic and biodegradable polyethyleneoxide surfactants, which act as the template. This nonionic, surfactant-neutral, inorganic-precursor templating pathway to mesostructures uses hydrogen bonding interactions between the hydrophilic surfaces of flexible micelles and $Si(OC_2H_5)_{4-x}(OH)_x$ hydrolysis products to assemble an inorganic oxide framework. Removal of the organic template via calcinations or extraction, results in mesoporous metal oxide.

Recently, a new class of mesoporous material was developed based on organized monolayers of functional molecules bound to a mesoporous support (FMMS). The functional molecules are attached to the mesoporous support similar to the preparation of self assembled monolayers (SAMs). The surface area and pore size of the FMMS can be engineered easier for FMMS. This is important because pore size is important for applications involving heavy metal uptake because these materials usually have a high surface area.

The silica-based generator of Applicant's invention however requires a functional group to bind and hold $^{225}$Ac so that the $^{213}$Bi can be eluted off the generator. The Applicant has chosen a sulfonic acid functional group similar to that existing in BioRad® AG-50 or MP-50 resins. In turn, a bi-functional ligand is used to attach the sulfonic acid group to the silica gel backbone. The ligand is bifunctional and is composed of two important parts. First, the ligand contains a group that can be covalently tethered to the surface of a porous silicate based sol-gel. Hydrolysis and covalent attachment of a triethoxysilane group accomplishes this requirement. In the presence of water, the triethoxysilane group hydrolyzes and condenses into Si—OH groups on the pore surface of the mesoporous sol-gel. Second, the ligand has to be very short composing of only a few carbon atoms. Third, the ligand must have a functional group, such as a sulfonic acid, that will bind $^{225}$AC and not $^{213}$Bi under certain conditions.

The silica-based cation-exchanger used for Applicant's present invention is an inorganic polymer. One way of synthesizing the silica-based cation-exchanger is through the sol-gel processes. The sol-gel process is a series of reactions involving an alkoxide precursor which form inorganic materials such as monolith glass and ceramic oxides. Sol-gel materials are inexpensive and simple to prepare. For Applicant's present invention, two different forms of SiO$_2$ were used. The first sol-gel material is a monolith glass, and the second sol-gel material used was templated mesoporous sol-gel.

The preparation of a sol-gel monolith involves five steps: mixing, casting, gelation, aging and drying. During the mixing stage, a liquid alkoxide precursor is hydrolyzed by mixing with water. The silanol groups then interact with each other in a condensation reaction forming a Si—O—Si network containing pores. Catalysts such as acids and bases can influence both the hydrolysis and condensation rates of the step. During the hydrolysis and condensation steps, a low-viscosity liquid is formed which can be cast into different molds. For the purpose of Applicant's present invention, this was not important because the molds formed were ground into a fine powder. At the gelation point, the viscosity increases sharply and a solid monolith gel forms. Aging is an important step in the preparation of sol-gel monoliths. During this step, polycondensation continues, which increases the strength of the gel. During the drying step, the liquid is removed from the interconnected pore network within the gel at room temperature under normal atmospheric pressure.

Applicant's present invention was developed and demonstrated as an improved generator capable of providing clinical quantities of $^{213}$Bi (at least 20-mCi) while simultaneously improving the generator yield and purity. In order to minimize radiation damage to the support, Applicant's invention involved replacing the organic polymer-based resins that have limitations in lifetime due to radiolysis with an inorganic sorbent material having superior radiation resistance. A silica-based cation-exchanger $^{225}$Ac/$^{213}$Bi generator was thus designed that would demonstrate selectivity, have a high capacity, withstand low pH, and be radiation resistant. Different forms of an inorganic backbone were tested in Applicant's present invention: monolith sol-gel, templated mesoporous sol-gel, crushed quartz, silica beads and silica gel resin. Nonporous silica gel gave the highest yield and purity. A bifunctional sulfonic ligand was grafted to the surface of the silica gel for the binding of $^{225}$AC. Over 99% of the $^{225}$AC was absorbed onto the surface of the resin and a high yield of $^{213}$Bi was eluted off the generator.

The following examples detail the procedure on the design and synthesis for the silica-based cation-exchanger $^{225}$Ac/$^{213}$Bi generator of the present invention. All chemicals were used as received from the manufacturer. The inorganic resin was characterized using scanning electron microscopy (SEM), Brunauer-Emmett-Teller (BET) particle analyzer, and X-ray photoelectric spectroscopy (XPS).

Example 1

Synthesis of Monolith Sol-gels. Base catalyzed: The monolith sol-gel was prepared using methanol, tetramethylorthosilicate (TMOS), 3-mercaptopropyltrimethoxysilane, and 0.5 M NaOH. In a vial, 250 µl of methanol and 250 µl of TMOS were combined followed by 150 µl of sulfonic acid or mercapto bifunctional ligand. Finally, 135 µl of 0.5 M NaOH was added to promote gelation, which occurred gels in three days. The gels were covered for 36 hours and allowed to cure. The cap was removed and the gel was allowed to air dry for 24 hours and then heated to 100° C. for 4 hours. The gel was allowed to cool to room temperature and was then ground to a fine powder.

Figure 1:
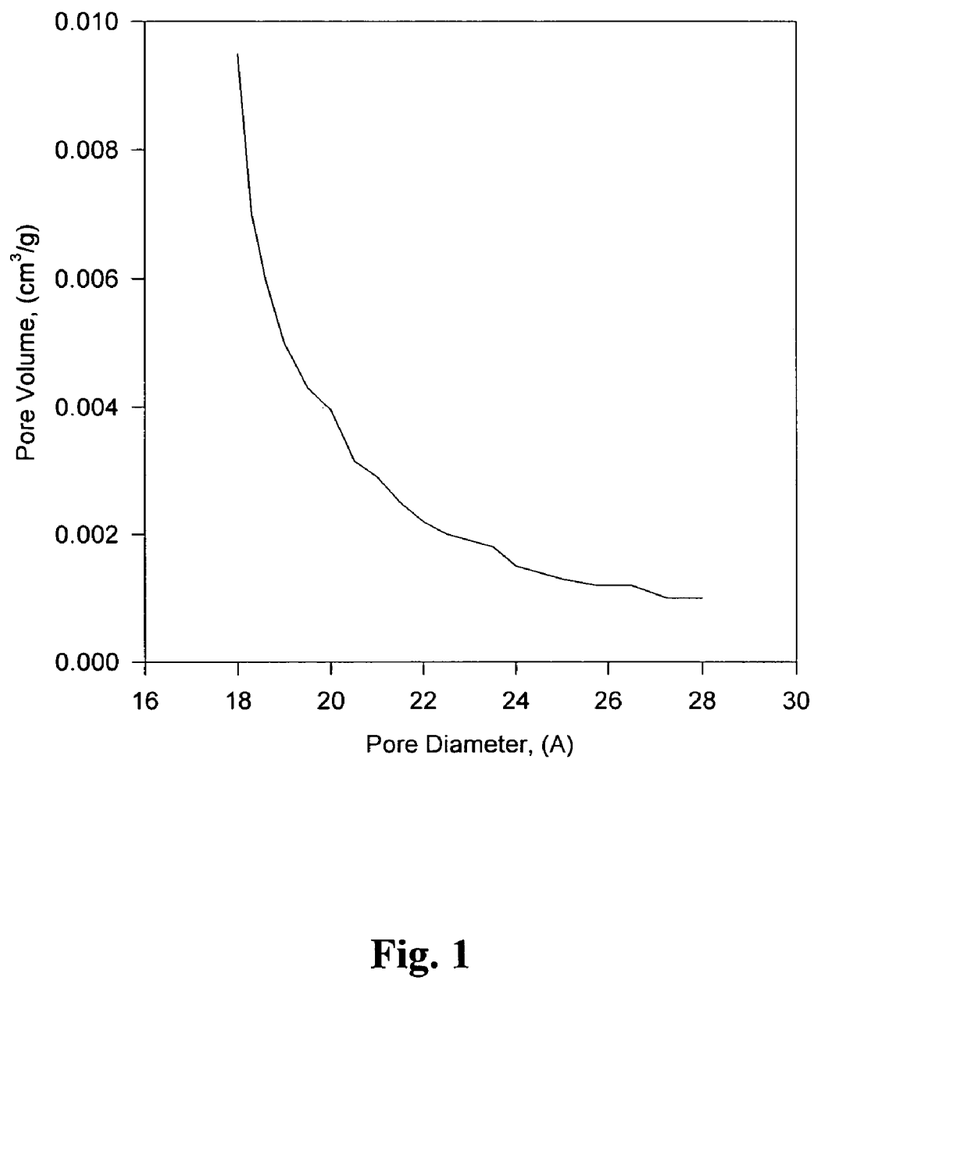
FIG. 1 shows the distribution of pore diameters for a mercapto-monolith sol-gel.

BET, SEM and XPS data were collected to characterize the base catalyzed monolith sol-gel. BET N$_2$ adsorption measurements were used to determine the distribution of pore sizes and the surface area of the gel. The specific surface area for the gel was 202 m$^2$/g with a total pore volume of 0.101 cc/g. The pore size distribution indicates if the material contains macropores (>500 Å), mesopores (20 Å to 500 Å), or micropores (<20 Å). FIG. 1 shows the distribution of pore diameters for the monolith sol-gel. The distribution of pores starts below 20 Å and decreases to around 27 Å. Since the instrument did not detect pores larger than 20 Å, the pore size is microporous. Microporous materials usually exhibit slow kinetics due to the small pore size, which restrict flow through the pores.

Example 2

Synthesis of Templated Mesoporous Sol-gel. The templated mesoporous sol-gel was prepared using a 10:1:560 molar ratio of tetraethylorthosilicate (TEOS):nonionic surfactant (15-S-15):H$_2$O. Tergitol 15-S-15 (secondary alcohol ethoxylate, Dow Chemical Company) was mixed rapidly in water for 30 minutes. The TEOS was then dissolved in the template solution. White solids formed within 5 minutes. The precipitated products were allowed to age under moderate stirring for 12 hours. The precipitated product was filtered, air dried at room temperature, and then calcined in air at 2 k min$^{-1}$ to 873 K for 12 hours to remove the template.

Figure 2:
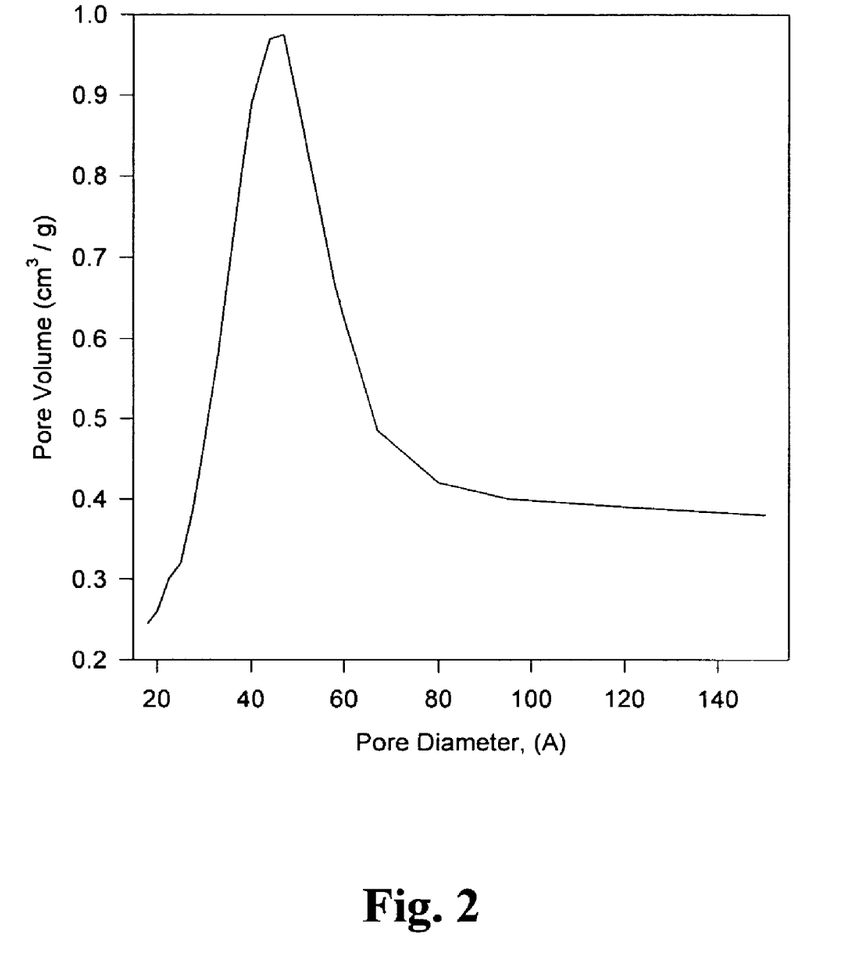
FIG. 2 shows the distribution of pore diameters for a calcined templated 15-S-15 sol-gel.

BET and SEM data was collected to characterize the mesoporous sol-gel. BET N$_2$ adsorption measurements were used to determine the distribution of pore sizes and the surface area of the sol-gel. After calcination, the specific surface area of the gel was 488 m$^2$/g with a total pore volume of 0.597 cc/g. Most solids with high surface area are, to some extent, porous. FIG. 2 shows the distribution of pore diameters for the templated 15-S-15 sol-gel. There is a narrow distribution of pore sizes between 20 Å to 70 Å with a maximum pore diameter of 47 Å. This narrow pore size distribution is in the desired mesopore range. FIG. 2 also indicates presence of a trace of micropores, but no macropores is evident. Based on the pore size distribution, both micro and mesopores contribute very little to the overall pore volume and surface area of this material. It is important to have large pore sizes at this stage because later, when the ligands are grafted to the sol-gel, the pore size will decrease. Obviously, the pore size has to be large enough for the ligand to fit inside and still have the space for fast metal cation absorption.

Example 3

Grafting of Bifunctional Ligands onto the Surface of Mesoporous Sol-Gel.

Synthesis of 10% FMMS Samples: 1.288 g of mesoporous silica was mixed with 2.0 ml of 3-mercaptopropyltrimethoxysilane (TMMPS) in 100 ml of chloroform. The mixture was stirred at room temperature for 5 days and then filtered. The collected solid was washed with chloroform to rinse away any surplus TMMPS, and then dried under vacuum.

Synthesis of 25% FMMS Samples: 4.32 g of mesoporous silica was stirred in 125 ml of distilled water and heated to reflux for 4 hours. After cooling to room temperature, the sample was centrifuged down, the water decanted off, and the silica was air-dried. This hydrated mesoporous silica was then stirred in 250 ml of toluene. 30 ml of TMMPS was then added and the solution was heated to reflux for 4 hours. After cooling to room temperature, the reaction mixture was filtered. The solid was washed with acetone followed by water, then dried at 80° C. overnight.

Synthesis of 75% FMMS Samples: 3.5 g of mesoporous silica was stirred in 100 ml of distilled water and heated to reflux for 3 hours. The mixture was cooled and filtered. The wet product was placed in a round bottom flask along with 250 ml of toluene. The flask was fitted with a Dean-Stark trap and the mixture was heated to reflux. The Dean-Stark distillation was continued until 4.5 ml of water dispersed through the mesoporous silica, which is approximately equal to four monolayers of water. The mixture was then treated with 20 ml of TMMPS, stirred overnight at room temperature, and heated to reflux for 4 hours. After cooling to room temperature, the mixture was filtered and washed thoroughly with 2-propanol and dried under vacuum.

Example 4

Oxidation of the Mercapto Ligand on the Mesoporous Sol-gel. Once 3-mercaptopropyltrimethoxysilane was tethered to the surface of the mesoporous sol-gel, the mercapto group had to be oxidized into a sulfonic acid. The mercapto group was oxidized using 30% $H_2O_2$ in glacial acidic acid (1:5 volume ratio) at 45° C. or concentrated $HNO_3$. For both methods, the functionalized sol-gel material was placed into a vial containing a stir bar and then covered with excess reducing agent and stirred for 24 hours. When using 30% $H_2O_2$, the vial was covered because the peroxide is light sensitive.

Example 5

Mercapto-quartz Resin. Crushed quartz was obtained by crushing quartz rods and sieving to obtain 150 μm particle size. The quartz substrate was rinsed and further hydroxylated using either 5 M KOH or 1% HF. The quartz was then dried in an oven at 100° C. for 30 minutes. 1.5 ml of 3-mercaptopropyltrimethoxysilane was added to 150 ml of anhydrous toluene. The dry quartz was added to the mercapto solution for 24 hours. The mercapto-quartz was then washed with toluene followed by methanol and then dried. The mercapto groups were then oxidized using concentrated $HNO_3$, as described in EXAMPLE 4.

Example 6

Silica Beads: The silica beads were prepared by mixing 2-ethylhexanol with 7.0 M $HNO_3$ in a separatory funnel. Once the 2-ethylhexanol layer was saturated with acid, the acid layer was removed. The 2-ethylhexanol layer was placed into a beaker and placed into a sonicator. Next, a saturated solution of $Na_2SiO_3.9H_2O$ was prepared by dissolving sodium meta-silicate in slightly basic solution of water. The sodium silicate solution was slowly added to the 2-ethylhexanol solution drop wise in the sonicator. The beads were allowed to set up in solution for 24 hours. The beads were then washed with water and air dried to allow the beads to shrink. The air dried silica beads were then sieved to 75-150

Example 7

Silica Gel Resins: The silica gel was first sieved to 125-250 μm. The silica gel (1.0 g) was then mixed with 10 ml of methanol, 200 μl of 3-mercaptopropyltrimethoxysilane, and 100 μl of 0.5 M NaOH. The mixture was stirred for 15 hours. The silica resin was washed with methanol and dried at 100° C. for 1 hour. The mercapto group was then oxidized with concentrated $HNO_3$ for 24 hours at room temperature to form the sulfonic acid group. The resin was then washed with large amounts of water to reduce the acidity.

Assessment of the degree of oxidation of the mercapto ligand using $H_2O_2$: X-ray photoelectron spectroscopy (XPS) was used to investigate the surface characteristic of the sample. Electron spectroscopy further provided information about the oxidation state of sulfur atoms on the surface of the mesoporous sol-gel. In mercapto group, the oxidation number of sulfur is −1, whereas the oxidation number of sulfur in the sulfonic group is +6. The distinct change in the electron binding energy corresponding to the two oxidation numbers of sulfur atoms are clearly seen in XPS. Table 1 lists the binding energies (eV) for the 2p electron orbital for sulfur atom.

TABLE 1

Binding Energies of 2p electrons for sulfur in $R-SCOCH_3$, R-SH and $R-SO_3H$ molecules measured by XPS:

| Sulfur Group | Binding Energy (eV) of sulfur 2p electrons |
|---|---|
| $R-SCOCH_3$ | 164.0 |
| R-SH | 163.6 |
| $R-SO_3H$ | 168.1 |

Figure 3:
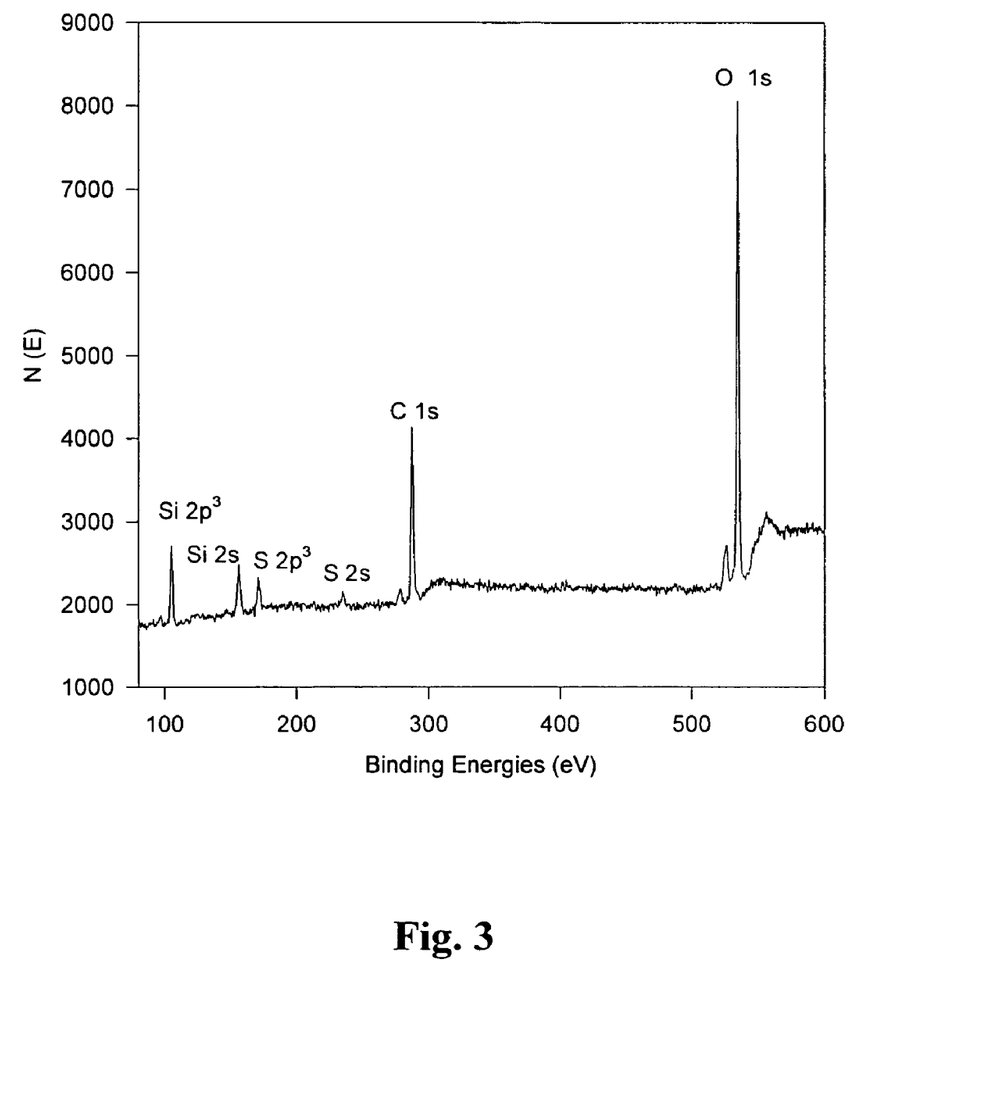
FIG. 3 is an x-ray photoelectron spectroscopy (XPS) spectrum at 0 minutes for an oxidized mercapto sol-gel resin.
Figure 4:
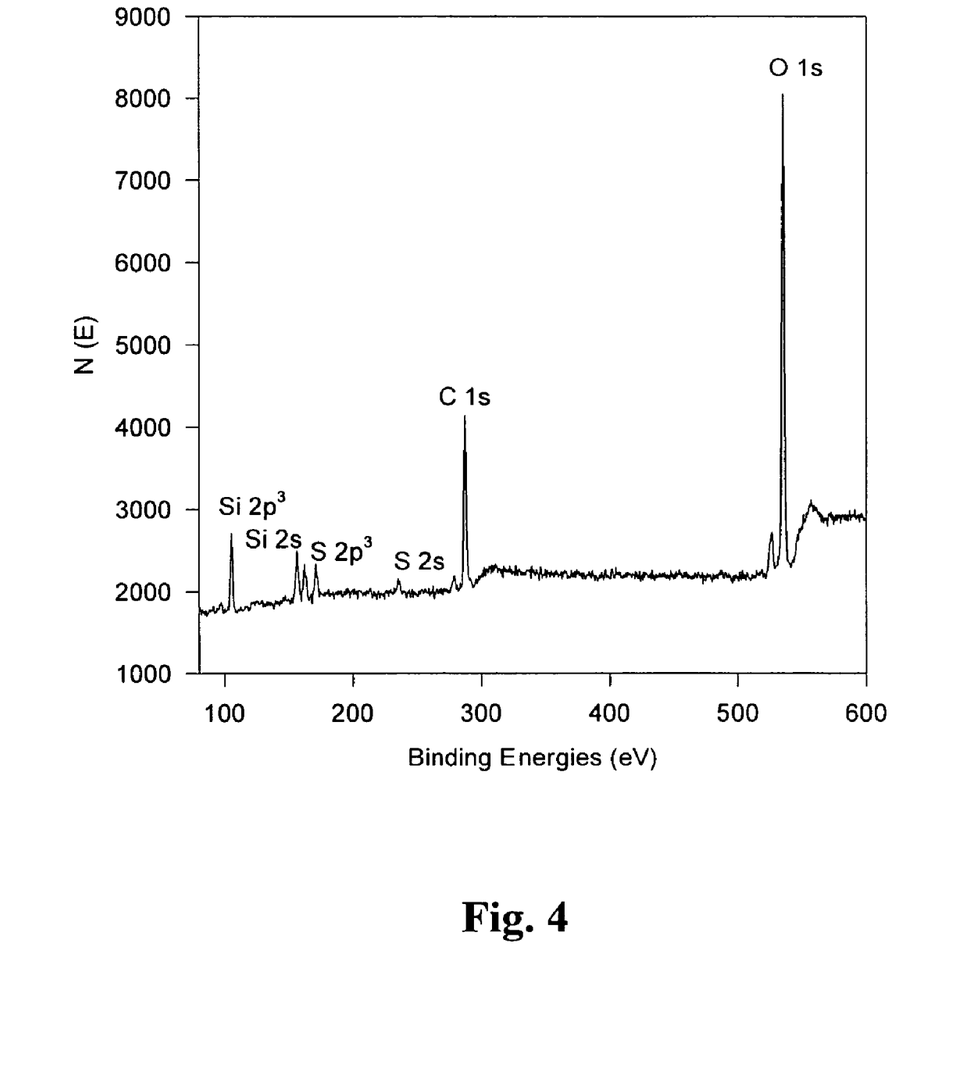
FIG. 4 is an XPS spectrum at 3 hours for the oxidized mercapto sol-gel resin.
Figure 5:
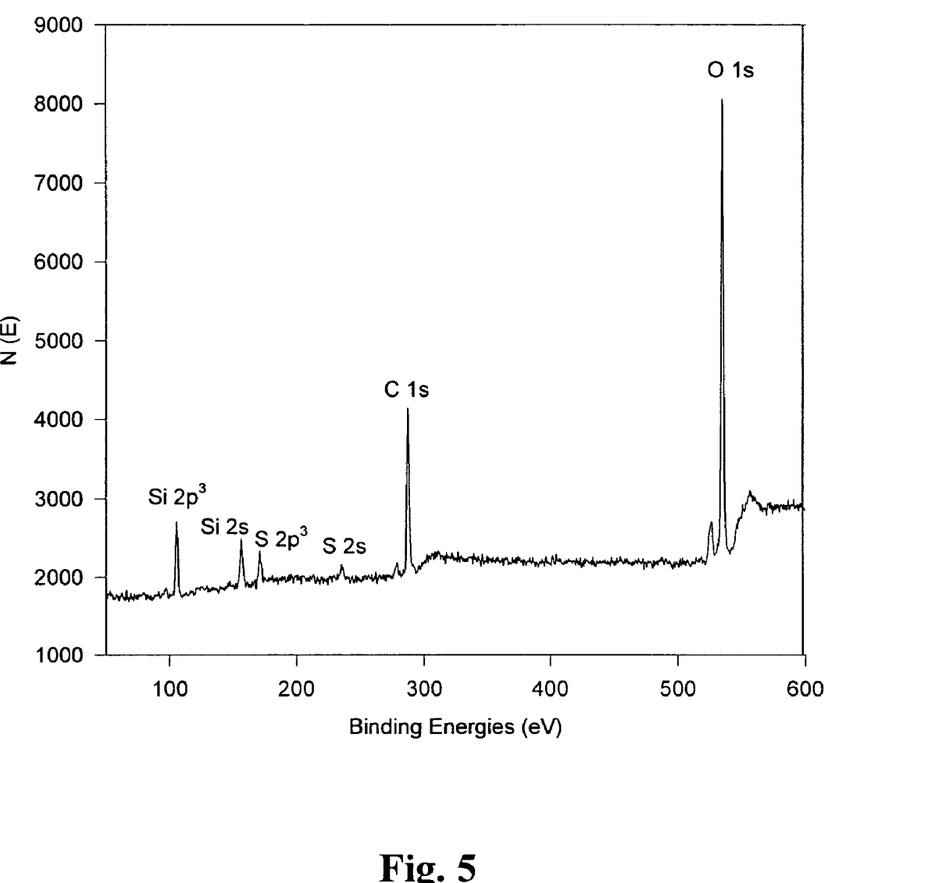
FIG. 5 is an XPS spectrum at 6 hours for the oxidized mercapto sol-gel resin.

A series of studies was conducted to examine the oxidation time of the functional group attached to the sol-gels. FIGS. 3, 4 and 5 are typical XPS spectra of the oxidized mercapto resins. Signals are as follows: 106 and 140 eV ($SiO_2$), 164 eV (R—SH), 168 eV and 250 eV (R—$SO_3H$), 295 eV (C), and 530 eV (O). For this study, the functionalized gels were placed into peroxide (30% $H_2O_2$) for a period of time (see Example 4). The time period started at 0 hours and continued to 24 hours. A sample was introduced to the oxidation solution every 30 minutes for the first 2 hours and then every hour after that. Table 2 shows the binding energies for the oxidized mercapto sol-gel sulfur vs. oxidation times.

TABLE 2

XPS Results of the Oxidation of Mercapto Resin using $H_2O_2$:

| | R-SH, R-SCOCH₃ | | R-SO₃H | |
|---|---|---|---|---|
| Mercapto Resin Oxidation Time (min) | Binding Energy (eV) | Relative Intensity (%) | Binding Energy (eV) | Relative Intensity (%) |
| 0 | 163.50 | 100 | Undetectable | 0 |
| 30 | 164.25 | 100 | Undetectable | 0 |
| 45 | 164.25 | 100 | Undetectable | 0 |
| 60 | 164.25 | 100 | Undetectable | 0 |
| 90 | 164.12 | 100 | Undetectable | 0 |
| 120 | 163.75 | 100 | 168.25 | 0 |
| 180 | 163.50 | 60 | 168.75 | 40 |
| 240 | 165.50 | 20 | 168.50 | 80 |
| 300 | Undetectable | 0 | 169.50 | 100 |
| 360 | Undetectable | 0 | 169.25 | 100 |
| BioRad AG-50 resin | Undetectable | 0 | 169.50 | 100 |

FIG. 3 shows a spectrum of a mercapto resin at the start of oxidation process (at time 0 min.). As seen, the spectrum shows only one signal at 165.50 eV corresponding to the 2p binding energy of the sulfur atom in mercapto functional group (see Table 1). There was no detectable oxidation before 1 hour. At 3 hours, a second signal at 168.25 eV, corresponding to the 2p binding energy of the sulfur atom in sulfonic acid functional group, started to appear, which is shown in FIG. 4. The sample that was oxidized for 180 min. appears to have 40% R—$SO_3H$ and approximately 60% R—SH. As time progresses, the R—SH signal decreases while the R—$SO_3H$ signal increases. FIG. 5 shows a spectrum after 6 hours of oxidation, indicating the disappearance of the signal at 164 eV from the mercapto group.

Figure 6:
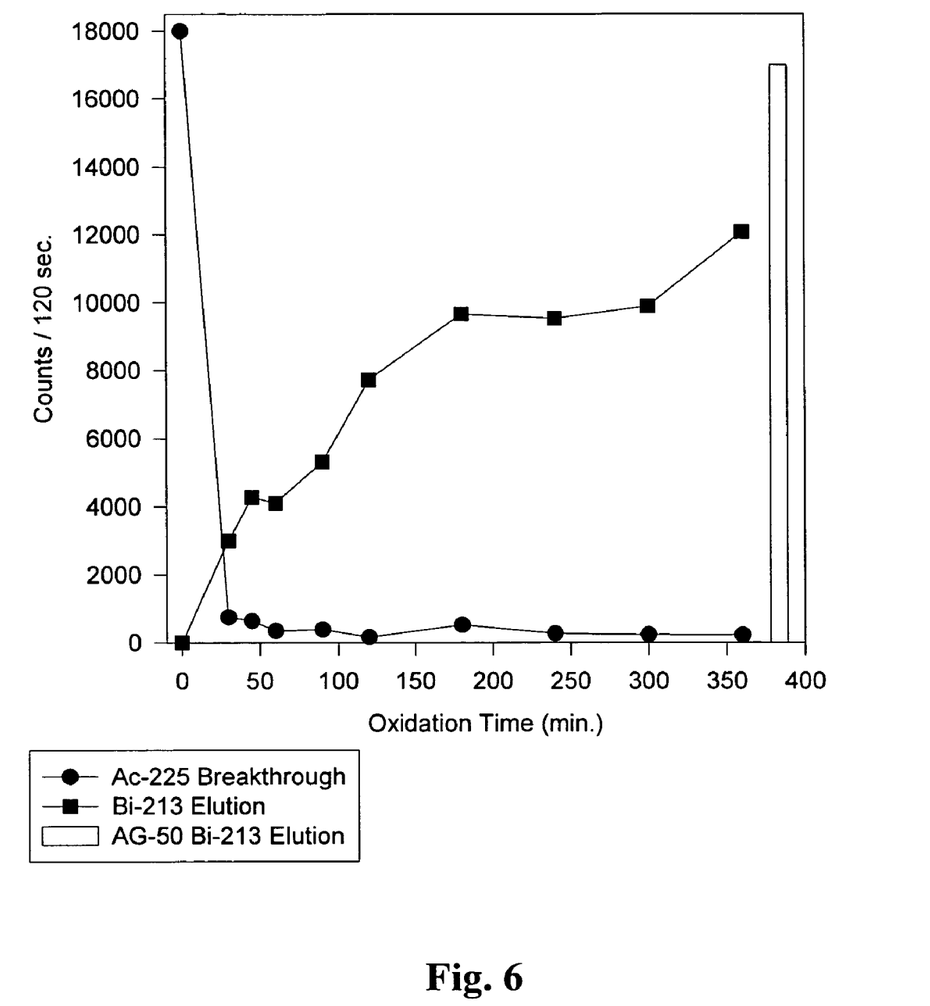
FIG. 6 shows the results of batch testing of $H_2O_2$ oxidized mercapto-resins.

Batch Testing for $^{225}Ac$ uptake and $^{213}Bi$ elution using the $H_2O_2$ oxidized mercapto resins: A successful sorbent material for a $^{213}Bi$ ion-exchange generator must have two characteristics: it must take up $^{225}AC$, and there must be a capability to selectively remove $^{213}Bi$ from the material. Batch tests were first conducted in which the uptake of carrier-free $^{225}AC$ (180 μCi) in 100 μl of 0.12 M $HNO_3$ and the elution of bismuth and actinium into 250 μl of 0.15 M hydroiodic acid were measured. BioRad® AG-50 was used as a standard to determine the inorganic resin capability. The results of the batch test are shown in FIG. 6.

One notable trend is the increase in $^{213}$Bi elution as the oxidation time increases. This correlates with the XPS data mentioned previously. The mercapto binds $^{213}$Bi and the sulfonic group binds $^{225}$AC. If both functional groups are on the resin, both actinium and bismuth will stay on the column. As the concentration of the mercapto groups decreases, the concentration of bismuth eluted off the resin will increase. The same trend also is observed with the sulfonic acid group; as the concentration of the sulfonic acid groups increases, the breakthrough of actinium decreases. After 6 hours, there was no significant increase in the amount of bismuth eluted off the resin. The maximum amount of bismuth eluted off the resin was 65%. Under similar conditions, there was a 96% elution of bismuth from BioRad® AG-50 resin. The purpose of the present invention was to reach or surpass this elution level.

The next study was the design of a $^{225}$Ac/$^{213}$Bi generator in the form of a column. Columns usually give better results because the actinium stays at the top of the column so there is little to no breakthrough of actinium.

Example 8

Figure 7:
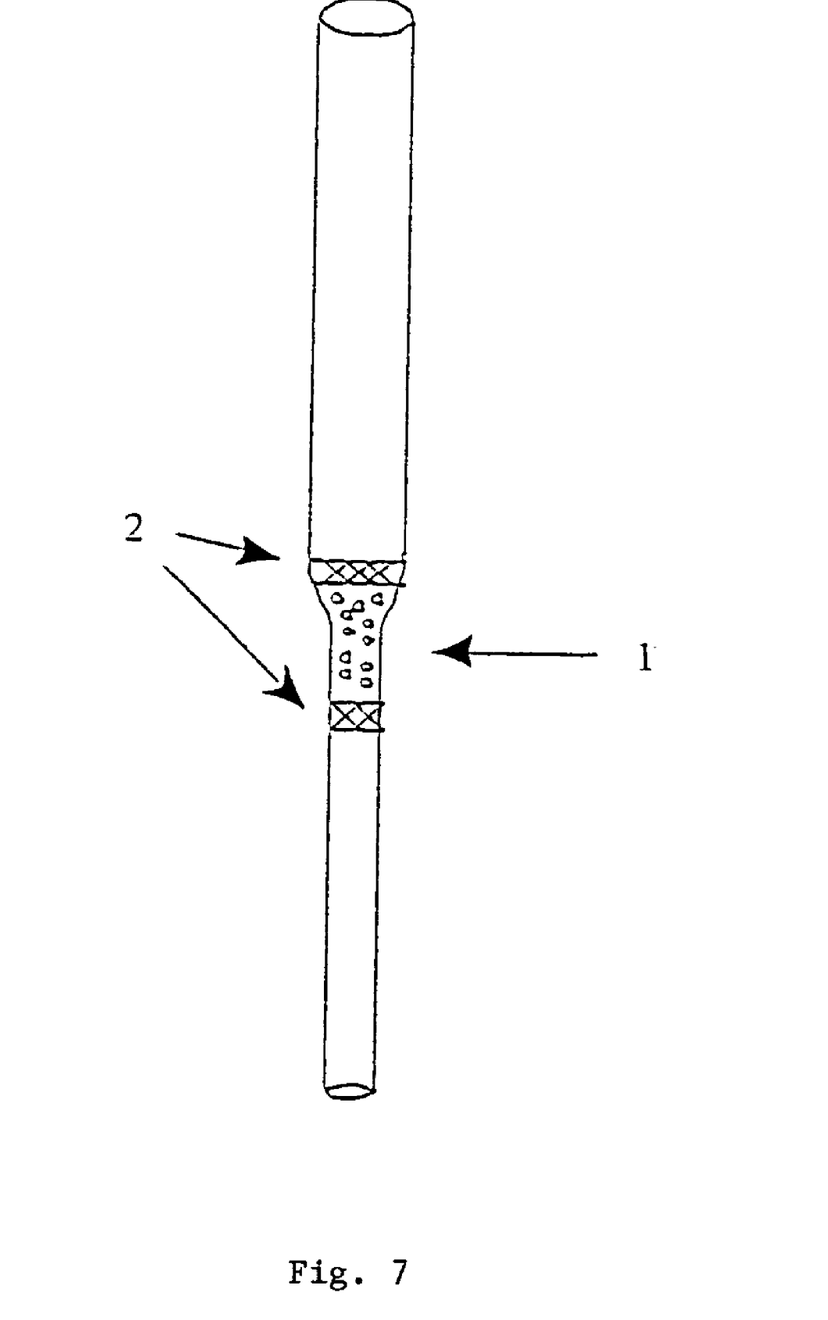
FIG. 7 is a schematic of Applicant's $^{225}$Ac/$^{213}$Bi generator column of the present invention.

Design of $^{225}$Ac/$^{213}$Bi Generator Columns: The sulfonic acid sol-gel was washed three times with 0.12 M HNO$_3$ to remove fine particles. Generators were made in disposable glass pipettes as shown in FIG. 7. A small piece of glass wool 2 was inserted into the neck of the pipette as a plug. Next, 100 mg (0.5 cm) of wet resin 1 was added above the glass wool followed by another piece of glass wool. The column was then washed with 8.0 M HNO$_3$ followed by three washes with 0.12 M HNO$_3$.

Figure 8:
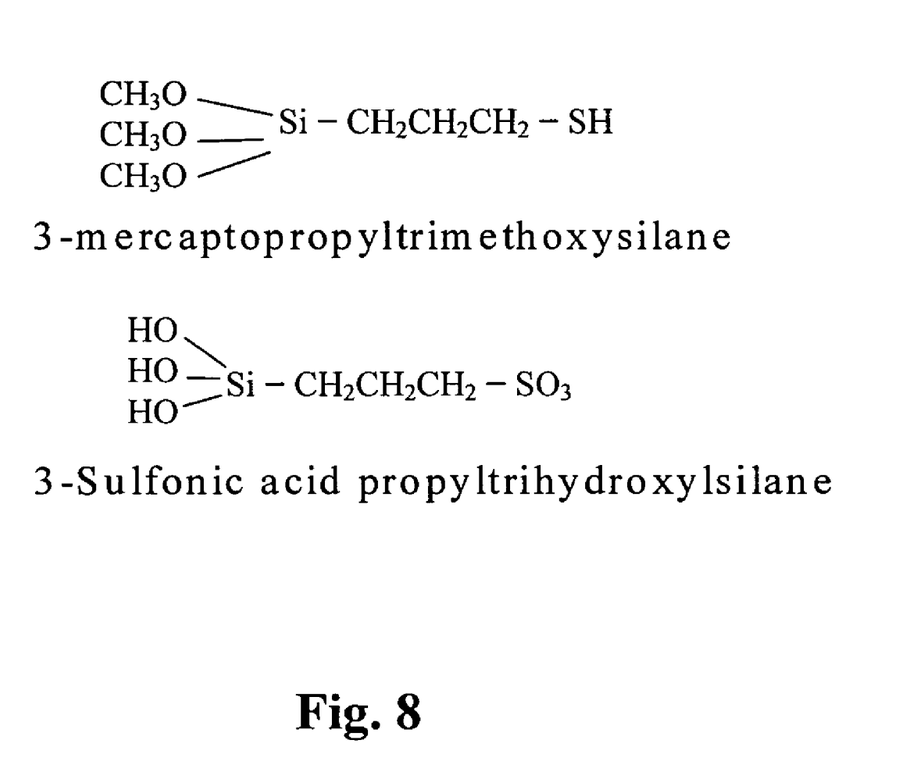
FIG. 8 shows the two bifunctional ligands that can be used for acquiring the final functionalized sulfonic acid resins of Applicant's invention.

Evaluation of Sulfonic Acid Resin vs. Oxidized Mercapto Resin: Preliminary results demonstrated that the functionalized sulfonic acid resins absorbed $^{225}$Ac and that $^{213}$Bi could be eluted off the resin with a few column bed volumes of 0.15 M HI (hydroiodic acid). There are two methods for acquiring the final functionalized sulfonic acid resins. The first method uses a mercapto ligand that can be oxidized using concentrated HNO$_3$ or 30% H$_2$O$_2$ into a sulfonic group. The second method uses a commercially available sulfonic acid ligand. Either ligand can be used with the formation of the monolith sol-gel. However, the sulfonic acid ligand cannot be used when grafting the ligand to the surface of the templated mesoporous sol-gel materials because the ligand lacks an alkoxide group (FIG. 8).

Figure 9:
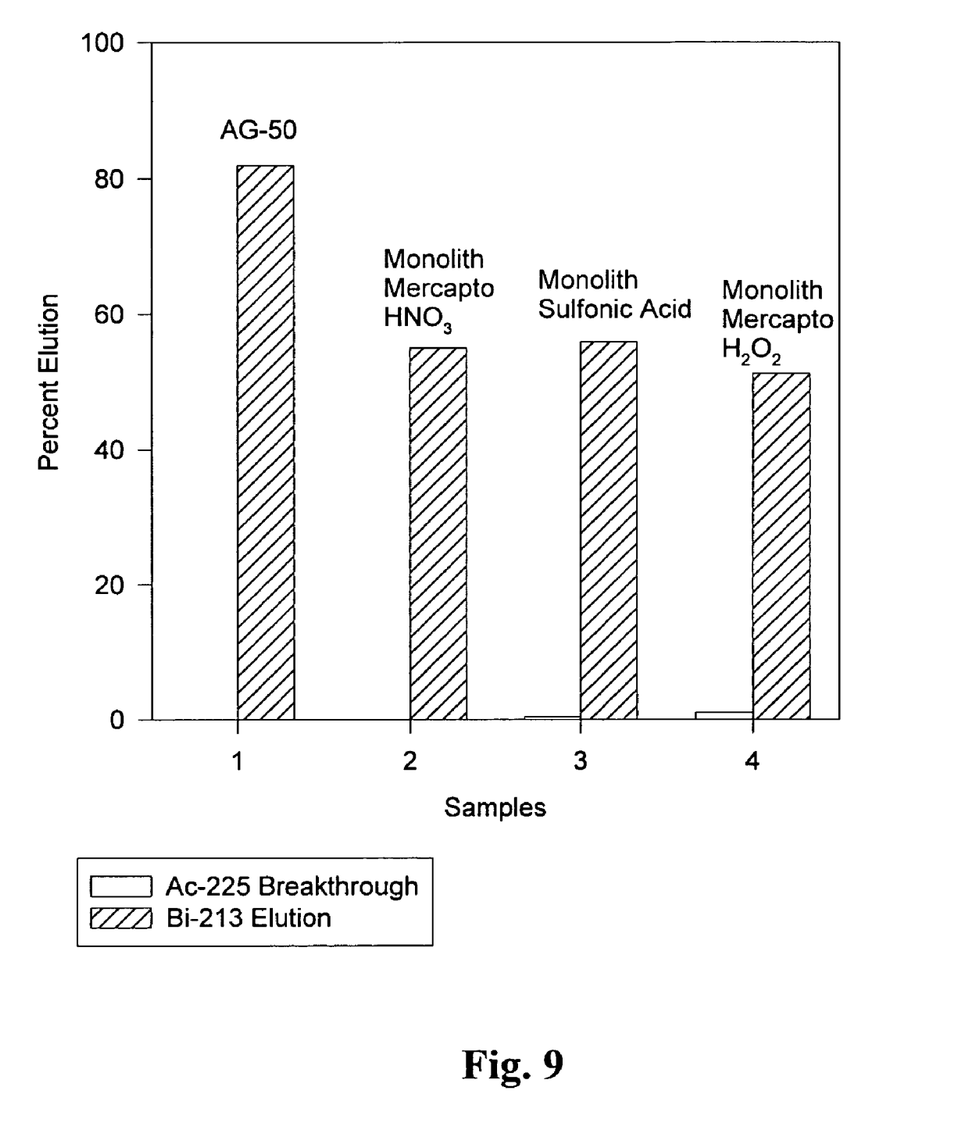
FIG. 9 shows a comparison of oxidized mercapto monolith sol-gel resin versus sulfonic acid monolith sol-gel resin.

FIG. 9 shows a comparison of oxidized mercapto monolith sol-gel versus sulfonic acid monolith sol-gel. Both resins were tested using column method and were compared with BioRad® AG-50 resin. As seen below, neither sulfonic acid resin out-performed the other. However, both sulfonic acid resins had lower $^{213}$Bi elution compared to BioRad® AG-50.

Example 9

Evaluation of the $^{225}$Ac/$^{213}$Bi Generator using 1.0 mCi of $^{225}$Ac: Both the oxidized mercapto resin and sulfonic acid resin performed lower than BioRad® AG-50 for low $^{225}$AC activity (1.0 µCi). The next step was to evaluate the resin using high $^{225}$AC activity (1.0 mCi). The resin was evaluated with 960 µCi of $^{225}$AC. $^{225}$AC was loaded onto the column with 500 µl of 0.12 M HNO$_3$. The column was then washed with 600 µl of 0.12 M HNO$_3$, followed by 400 µl of 1.2 M HNO$_3$. 1.2 M HNO$_3$ was used to elute the $^{225}$AC further into the resin. Finally, the column was washed with 400 µl of water. All of the washes were measured for $^{225}$AC breakthrough. There was a low breakthrough (0.0004 µCi) of $^{225}$AC with the first two washes. After the 1.2 M HNO$_3$ wash, there was a breakthrough of 2.4 µCi of $^{225}$Ac or 0.25% of original total. This was expected because at higher concentrations of the HNO$_3$ can elute $^{225}$AC off of resins. However, washing with water showed a decrease in the $^{225}$AC breakthrough. This resin retained $^{225}$Ac almost quantitatively.

Figure 10:
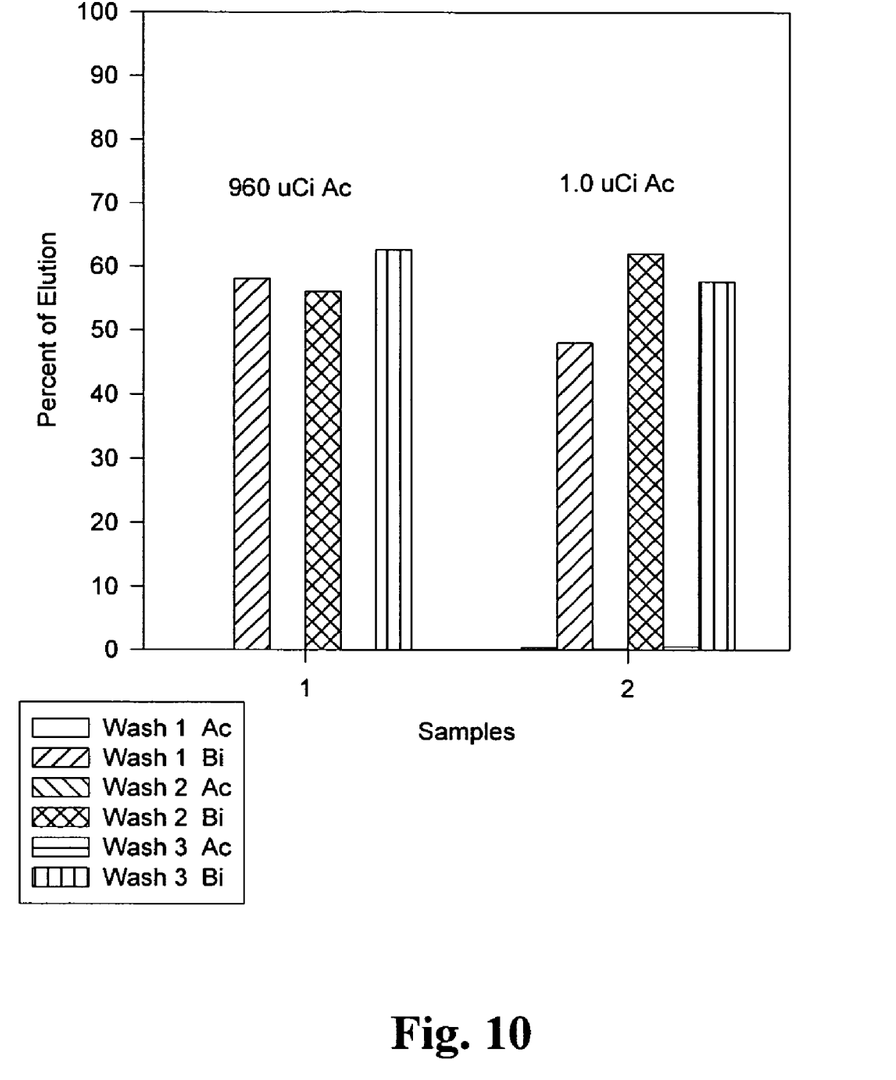
FIG. 10 shows a comparison of $^{225}$Ac/$^{213}$Bi yields for high activity versus low activity for monolith sulfonic sol-gel resin.

Next, the resin was tested for $^{213}$Bi elution. In a useful generator, the $^{225}$AC must remain on the resin, but $^{213}$Bi must be eluted on the column. For a typical $^{213}$Bi elution, the resin was washed with 200 µl of 0.15 M HI followed by 200 µl of H$_2$O. This was performed three times on the column. An average of the three washes gave a 58% elution of the $^{213}$Bi with little to no breakthrough of $^{225}$AC. The results of the $^{225}$Ac uptake and $^{213}$Bi elution are shown in FIG. 10.

Figure 11:
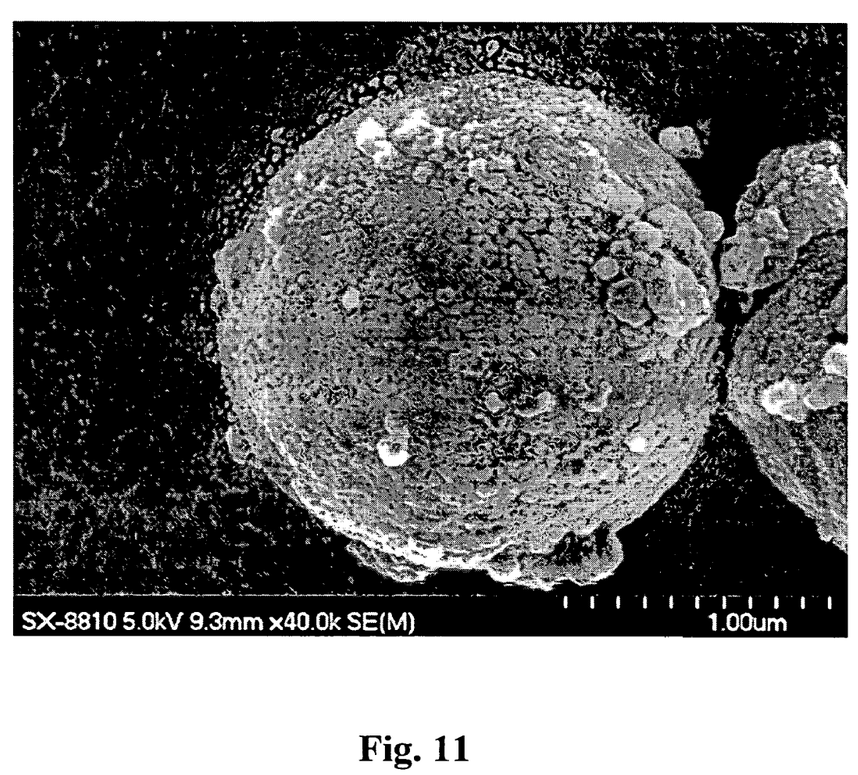
FIG. 11 is an SEM image of oxidized mercapto templated sol-gel.

Scanning Electron Microscope Data of BioRad® AG-50, MP-50 and Functionalized Monolith Resin: Since neither the oxidized mercapto or sulfonic acid resins could be optimized to improve the 60% $^{213}$Bi elution, a scanning electron microscope (SEM) was used to investigate the particle size and shape of BioRad® AG-50, MP-50 and functionalized inorganic sol-gel resins. BioRad® AG-50 and MP-50 both have a styrene divinylbenzene matrix with a functionalized R—SO$_3$Na group. However, they behave differently due to their cross-linkage. The SEM for BioRad® AG-50 at a magnification of 4.5 mm×700, showed the individual particles are round spheres without any noticeable pores. The SEM for BioRad® MP-50 showed a porous material that is both mesoporous and macroporous. Finally, FIG. 11 shows an image of oxidized mercapto templated sol-gel. Its visual characteristics are similar to BioRad® MP-50. BioRad® AG-50 is nonporous and both BioRad® MP-50 and the monolith sol-gel are porous, which could be a key factor in the elution of bismuth.

Figure 12:
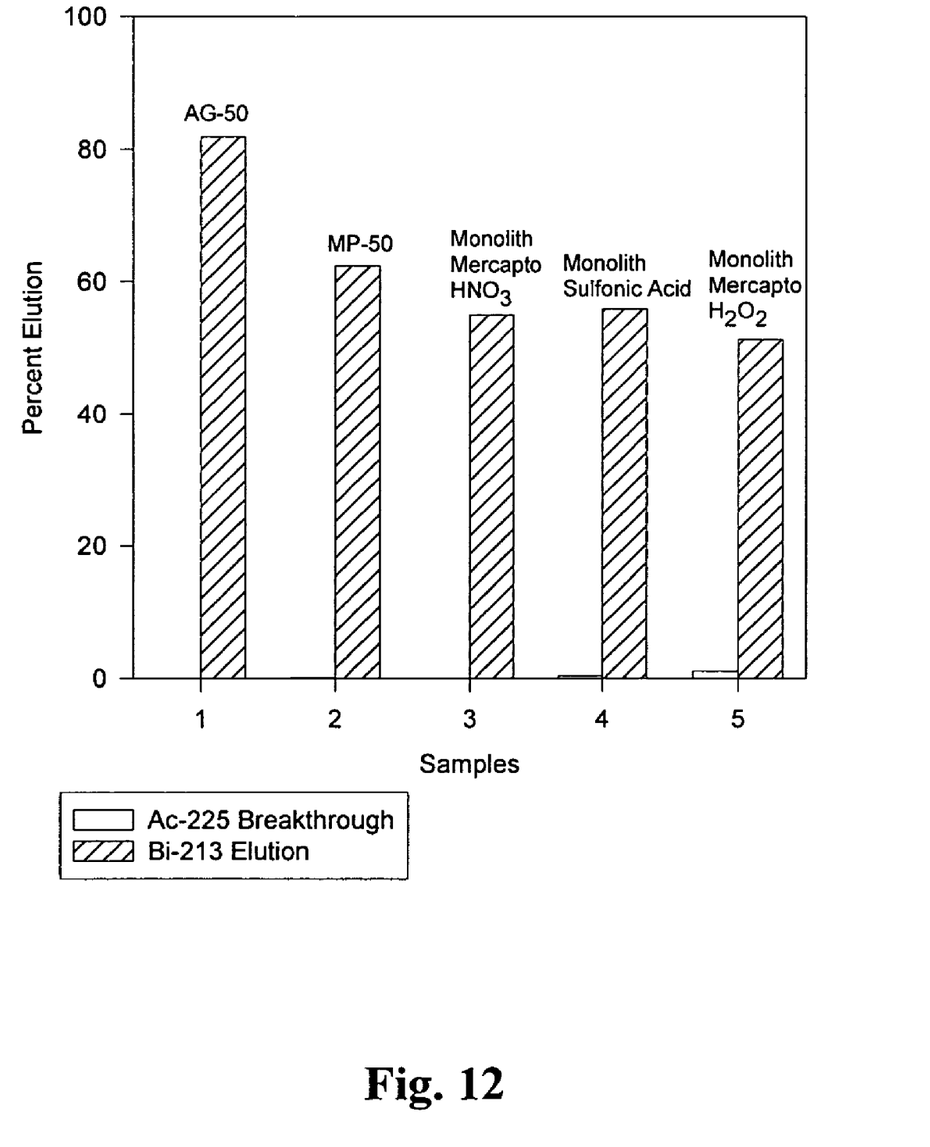
FIG. 12 shows a comparison of nonporous BioRad® AG-50 versus porous BioRad® MP-50 and sol-gel resins of the present invention.

Comparison of Porous vs. Nonporous Functionalized Inorganic Resins: Typically, high surface area resins are needed for metal ion uptake. However, high surface area with mesopores could inhibit the elution of the $^{213}$Bi. This study compared porous BioRad® MP-50 and monolith sol-gel to nonporous BioRad® AG-50. Five different resins were evaluated: BioRad® AG-50, BioRad® MP-50, conc. HNO$_3$ oxidized mercapto monolith sol-gel, H$_2$O$_2$ oxidized mercapto monolith sol-gel and sulfonic acid monolith sol-gel. All resins were evaluated using the column method. FIG. 12 shows the results of this study. All five samples absorbed $^{225}$AC with little to no breakthrough. Nonporous BioRad® AG-50 showed a high percentage (82%) of $^{213}$Bi elution, while the porous resins had approximately one-third (57%) less $^{213}$Bi elution. It is important to note that Applicant's synthesized mesoporous resins compared well with the porous BioRad® MP-50 and exhibited the same range of $^{213}$Bi elution.

The results of this study show that there is a difference in the elution of bismuth between porous and nonporous materials. The mesoporous materials could have lower bismuth elution due to the mesopore channels that the metal ions have to flow through. If the 0.15 M HI solution flowed more slowly through the column, $^{213}$Bi elution yield could be improved. The problem with slowing down the flow rate is the $^{213}$Bi half-life of 45 minutes. Within 45 minutes, the $^{213}$Bi atoms must be eluted from the column, neutralized, attached to an antibody and finally introduced to the cancer cell. A slower rate is not possible for this reason.

Example 10

Figure 13:
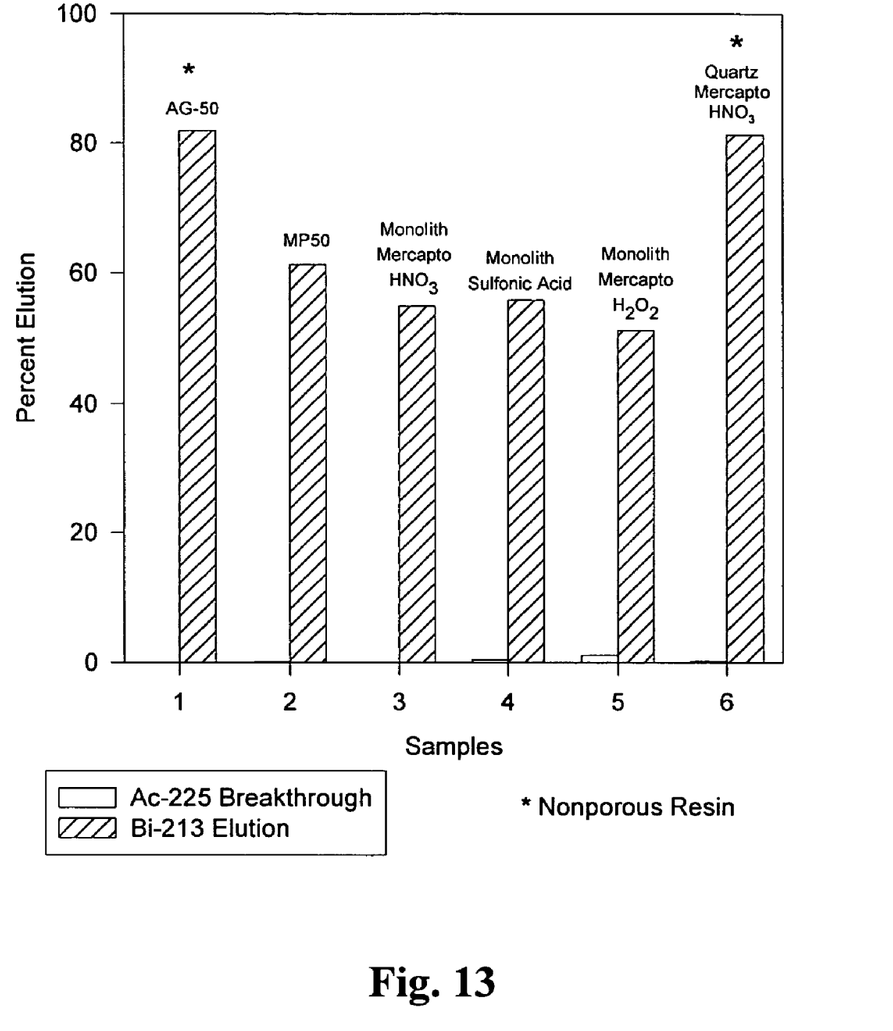
FIG. 13 shows a comparison of $^{225}$Ac/$^{213}$Bi yields for nonporous resins versus porous resins.

Evaluation of Nonporous Mercapto-quartz Resin: For all of the mercapto-quartz resin studies, they were performed in column mode using approximately 10 μCi of $^{225}$AC. The column, $^{225}$AC uptake and $^{213}$Bi elution was prepared and performed as mentioned above. FIG. 13 shows the results of this study. First the mercapto-quartz had >99% uptake of $^{225}$Ac. As for the $^{213}$Bi elution, 81% of the bismuth was eluted off the column. This is a significant increase over previous porous mercapto-sol gel resins (56%). When comparing the mercapto-quartz resin to BioRad® AG-50, the results were very similar. BioRad® AG-50 gave 82% $^{213}$Bi elution while the mercapto-quartz resin had 81% $^{213}$Bi elution. As for $^{225}$AC breakthrough, the mercapto-resin had less than 0.19%. The silica beads should give similar results. The silica beads were mercaptopropyltrimethoxysilane ligand.

While there has been shown and described what are at present considered the preferred embodiments of the invention, it will be obvious to those skilled in the art that various changes and modifications can be made therein without departing from the scope of the invention defined by the appended claims.

What is claimed is:

1. A radionuclide generator system for radiochemical separation of daughter radionuclides from a solution of parental radionuclides, the generator system comprising: a resin material comprising a silica-based cation-exchanger structure having at least one ligand covalently attached to the surface of said silica-based structure wherein each ligand covalently attached to the surface of said silica-based structure comprises a silane group having desirable surface functionality to enable the covalent attachment of said ligand thereon said surface of said structure, each ligand covalently attached to the surface of said silica-based structure further comprises a second chemical group capable of binding and holding said parental radionuclides on said resin material while allowing said daughter radionuclides to elute off said resin material, wherein each ligand covalently attached to the surface of said silica-based structure has a carbon chain with 4 or less carbons to maintain radiation stability of said resin material, wherein said silica-based structure of said resin material is selected from the group consisting of monolith sol-gels, templated mesoporous sol-gels, and nonporous silica gels, wherein the generator system is capable of providing clinical quantities of the daughter radionuclides of at least 20-mCi.

2. The radionuclide generator system of claim 1 wherein said silica-based structure of said resin material is a monolith sol-gel.

3. The radionuclide generator system of claim 1 wherein said silica-based structure of said resin material is a templated mesoporous sol-gel.

4. The radionuclide generator system of claim 1 wherein said silica-based structure of said resin material is nonporous silica gel.

5. The radionuclide generator system of claim 1 wherein said number of carbons in said carbon chain is less than 4.

6. The radionuclide generator system of claim 1 wherein said ligand is a bifunctional sulfonic acid ligand.

7. A $^{213}$Bi generator system for separation of $^{213}$Bi from a solution of parental radionuclides, the generator comprising: a resin material comprising a silica-based cation-exchanger structure having at least one ligand covalently attached to the surface of said silica-based structure wherein each ligand covalently attached to the surface of said silica-based structure comprises a silane group having desirable surface functionality to enable the covalent attachment of said ligand thereon said surface of said structure, each ligand covalently attached to the surface of said silica-based structure further comprises a second chemical group capable of binding and holding said parental radionuclides on said resin material while allowing the $^{213}$Bi daughter to elute off said resin material, wherein each ligand covalently attached to the surface of said silica-based structure has a carbon chain with 4 or less carbons to maintain radiation stability of said resin material, wherein said silica-based structure of said resin material is selected from the group consisting of monolith sol-gels, templated mesoporous sol-gels, and nonporous silica gels, wherein the generator system is capable of providing clinical quantities of $^{213}$Bi of at least 20-mCi.

8. The $^{213}$Bi generator system of claim 7 wherein said silica-based structure of said resin material is a monolith sol-gel.

9. The $^{213}$Bi generator system of claim 7 wherein said silica-based structure of said resin material is a templated mesoporous sol-gel.

10. The $^{213}$Bi generator system of claim 7 wherein said silica-based structure of said resin material is nonporous silica gel.

11. The $^{213}$Bi generator system of claim 7 wherein said ligand is a bifunctional sulfonic acid ligand.

12. The $^{213}$Bi generator system of claim 11 wherein said bifunctional sulfonic acid ligand is 3-sulfonic acid propyltrihydroxysilane.

13. The $^{213}$Bi generator system of claim 7 wherein said parental radionuclide is $^{225}$Ac.

14. The radionuclide generator system of claim 1 wherein: the solution of parental radionuclides is acidic.

15. The radionuclide generator system of claim 1 further comprising:
an acidic solution for eluting the daughter radionuclides off said resin material.

16. The radionuclide generator system of claim 1 further comprising:
an aqueous solution for eluting the daughter radionuclides off said resin material.

17. The $^{213}$Bi generator system of claim 7 wherein: the solution of parental radionuclides is acidic.

18. The $^{213}$Bi generator system of claim 7 further comprising:
an acidic solution for eluting the $^{213}$Bi daughter off said resin material.

19. The $^{213}$Bi generator system of claim 7 further comprising:
an aqueous solution for eluting the $^{213}$Bi daughter off said resin material.

* * * * *